United States Patent [19]

Buelt et al.

[11] Patent Number: 4,957,393
[45] Date of Patent: Sep. 18, 1990

[54] IN SITU HEATING TO DETOXIFY ORGANIC-CONTAMINATED SOILS

[75] Inventors: James L. Buelt, Richland; Kenton H. Oma, Richland, both of Wash.

[73] Assignee: Battelle Memorial Institute, Richland, Wash.

[21] Appl. No.: 181,635

[22] Filed: Apr. 14, 1988

[51] Int. Cl.$^5$ .............................................. E02D 3/00
[52] U.S. Cl. ............................................ 405/128; 405/258
[58] Field of Search ............... 405/128, 129, 258, 131, 405/234, 263; 175/16; 299/14; 404/79, 77; 110/346, 246, 237; 252/626, 628, 633; 166/248, 271

[56] References Cited

U.S. PATENT DOCUMENTS

| | | | |
|---|---|---|---|
| 1,512,125 | 10/1924 | Mende | 404/79 |
| 1,715,970 | 6/1929 | Williams | 405/50 X |
| 1,966,760 | 7/1934 | Irvine | 404/79 |
| 1,993,642 | 3/1935 | Harts et al. | 175/16 |
| 2,099,328 | 11/1937 | Casagrande | 166/248 X |
| 2,308,860 | 1/1943 | Clark | 175/16 |
| 2,795,279 | 6/1957 | Sarapuu | 166/11 |
| 3,169,577 | 2/1965 | Sarapuu | 166/42 |
| 3,208,674 | 9/1965 | Bailey | 299/14 X |
| 3,417,823 | 12/1968 | Faris | 166/248 |
| 3,972,372 | 8/1976 | Fisher et al. | 166/248 |
| 3,988,036 | 10/1976 | Fisher et al. | 299/14 X |
| 4,196,329 | 4/1980 | Rowland et al. | 219/10.81 |
| 4,376,598 | 3/1983 | Bourns et al. | 405/258 |
| 4,424,149 | 1/1984 | Bege et al. | 252/626 X |
| 4,498,535 | 2/1985 | Bridges | 219/10.81 X |
| 4,518,399 | 5/1985 | Croskell et al. | 405/129 X |
| 4,579,391 | 4/1986 | Mouat et al. | 166/248 X |
| 4,581,163 | 4/1986 | Meininger et al. | 252/626 X |
| 4,651,825 | 3/1987 | Wilson | 166/248 X |
| 4,670,148 | 6/1987 | Schneider | 405/129 X |
| 4,670,634 | 6/1987 | Bridges et al. | 299/14 X |
| 4,697,532 | 10/1987 | Furukawa et al. | 110/346 |

FOREIGN PATENT DOCUMENTS

| | | | |
|---|---|---|---|
| 1166151 | 4/1984 | Canada | 166/39 |
| 1059846 | 6/1959 | Fed. Rep. of Germany . | |
| 1320921 | 4/1963 | France | 405/258 |
| 0692933 | 10/1979 | U.S.S.R. | 405/258 |
| 0927898 | 5/1982 | U.S.S.R. | 405/131 |
| 1004528 | 3/1983 | U.S.S.R. | 405/258 |
| 1139799 | 2/1985 | U.S.S.R. | 405/258 |

Primary Examiner—Dennis L. Taylor
Attorney, Agent, or Firm—Dellett, Smith-Hill and Bedell

[57] ABSTRACT

A method and apparatus for decontaminating ground areas where toxic chemicals are buried comprises disposition of a plurality of spaced electrodes in the ground to be treated and application of a voltage across the electrodes for bringing about current flow through the ground. Power delivered to the ground volatilizes the chemicals which are collected and directed to a gas treatment system. The preferred form of the invention employs high voltage arc discharge between the electrodes for heating a ground region to relatively high temperatures at relatively low power levels.

12 Claims, 5 Drawing Sheets

IN SITU HEATING TO DETOXIFY ORGANIC-CONTAMINATED SOILS

BACKGROUND OF THE INVENTION

This invention was made with government support under contract number DE-AC06-76RLO 1830, awarded by the U.S. Department of Energy. The government has certain rights in the invention.

A substantial number of ground contaminated areas exist, especially as the result of industrial disposal, which either threaten populated areas or which cannot be used for conventional purposes Soil heating techniques have been proposed for treating contaminated soils containing volatile or semi-volatile organics, such as dioxins, PCB's, and light hydrocarbons. Known methods of heating the soil are relatively cumbersome and expensive, or are incapable of heating the soil itself to the desired depth for removing large quantities of contaminants. For example, radio frequency heating can be expensive and furthermore is capable of treating only a superficial region of the soil.

In Brouns et al U.S. Pat. No. 4,376,598, in situ vitrification of soil is described wherein sufficient electrical energy is applied via electrodes in the ground for converting the soil itself to a conductive, i.e., liquid, state which is then allowed to harden into a vitrified mass. Although, as a result of the intense heat generated in the vitrification process, volatile materials can be driven off or pyrolyzed, the electrical power requirements in heating the soil are reduced in accordance with the present invention for the purpose of volatilizing or pyrolyzing organic materials.

In accordance with the present invention, soils are heated electrically to temperatures substantially lower than those employed for vitrifying the soil. A ground region is heated to a temperature between 100° C. and 1200° C. to volatilize and/or pyrolyze undesired material. For the most part a steady source of resistive heating power, as employed for in situ vitrification, is neither required nor desirable for controlled temperature heating of soil. Although such AC or DC resistive heating can be employed to reduce soil moisture, this type of heating is not acceptable when the soil begins to dry. For dry soil, or when the moist soil tends to dry out in process, the soil becomes a poor electrical conductor such that resistive heating becomes ineffective.

If sufficient DC or AC voltage is applied between electrodes to produce continuous arcing, large or artificially cooled electrodes may be required, and once a gas plasma forms, higher currents are drawn from the power supply to maintain a reasonable power level. That is, as long as current is flowing, the voltage between electrodes then remains substantially lower than employed to initiate the current in the first place because gases in the electrical path become ionized to a more conductive state.

SUMMARY OF THE INVENTION

In accordance with the present invention, a region of ground containing hazardous, volatilizable material is heated to a temperature between 100° and 1200° C. by applying a voltage between a pair of electrodes spanning the region and causing a current flow therebetween for volatilizing the hazardous material. In accordance with a preferred embodiment of the present invention, the voltage between electrodes is applied in a range of 100–2,000 kilovolts DC for heating the region by intermittent DC arcing. A high voltage impulse generator is preferably employed which causes direct current discharges between electrodes, separated by short time periods to permit any ionized gases to recombine. This system enables the delivery of effective power to the ground at reasonable power levels for heating the ground to the required temperature and volatilizing the undesired material.

In accordance with another aspect of the present invention, a plurality of electrodes are inserted into the ground, and the power supply is switched between various pairs of electrodes. According to yet another aspect of the present invention, an electrically conductive heavy oil is inserted in the ground region between electrodes and the soil region is heated by AC or DC resistance heating through the conductive heavy oil. According to a further aspect of the invention, a negative pressure is maintained with respect to the treated region of ground by means of a hood over the ground surface being treated or hollow electrodes through which the volatilized material is withdrawn by an induced draft or vacuum source.

It is therefore an object of the present invention to provide an improved method and apparatus for detoxifying sites containing hazardous volatilizable material.

It is another object of the present invention to provide an improved method and apparatus for detoxifying sites containing hazardous, volatilizable material on a reasonably economic basis.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

Figure 1:
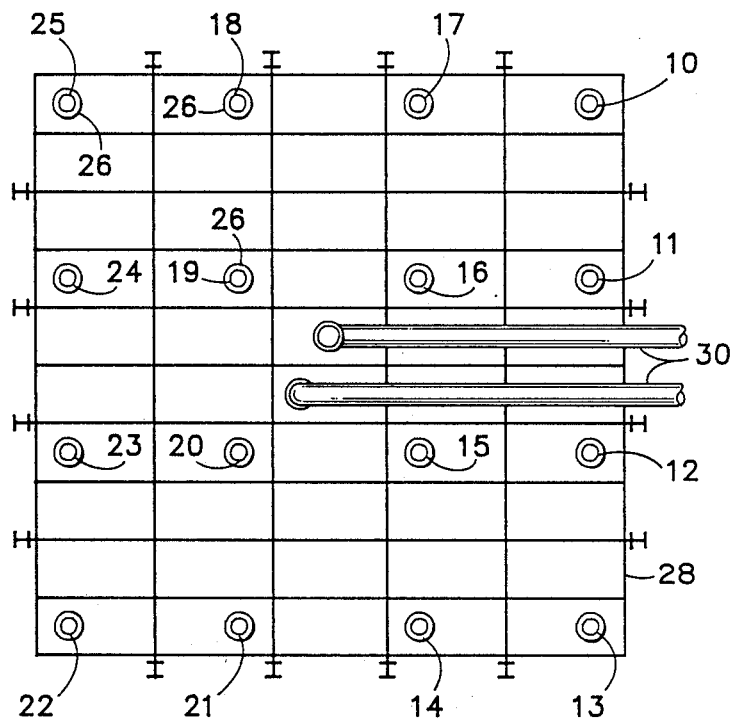
FIG. 1 is a top view of an in situ heating hood apparatus.
Figure 3:
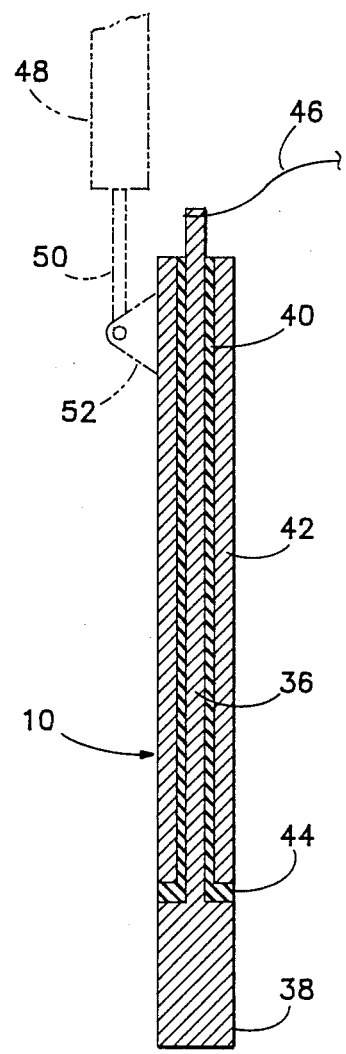
Figure 4:
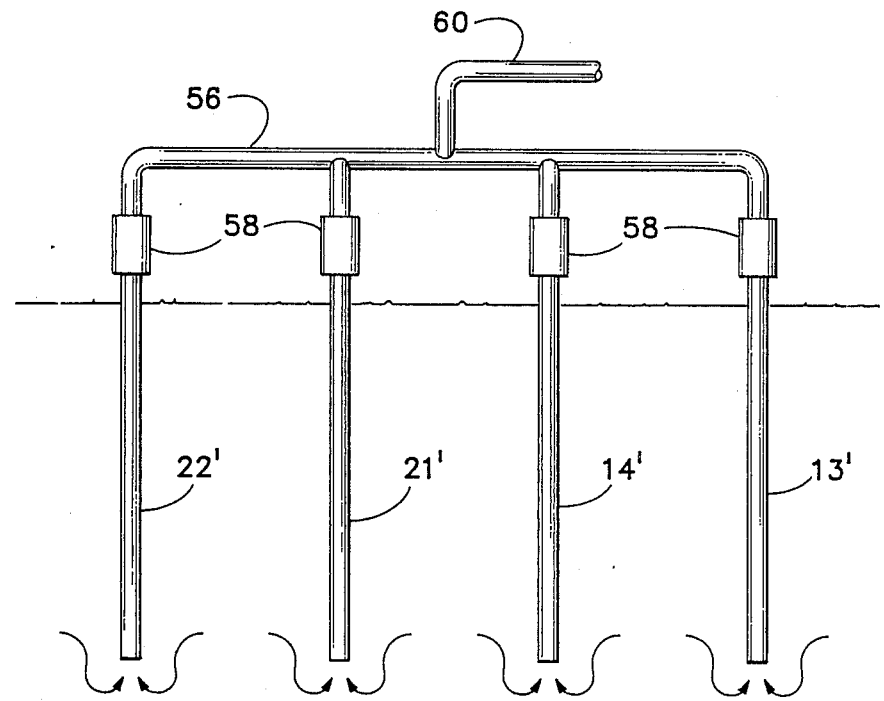
Figure 5:
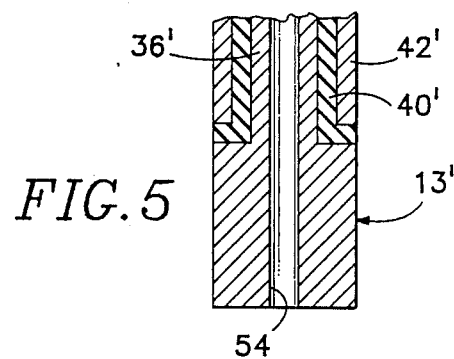
Figure 6:
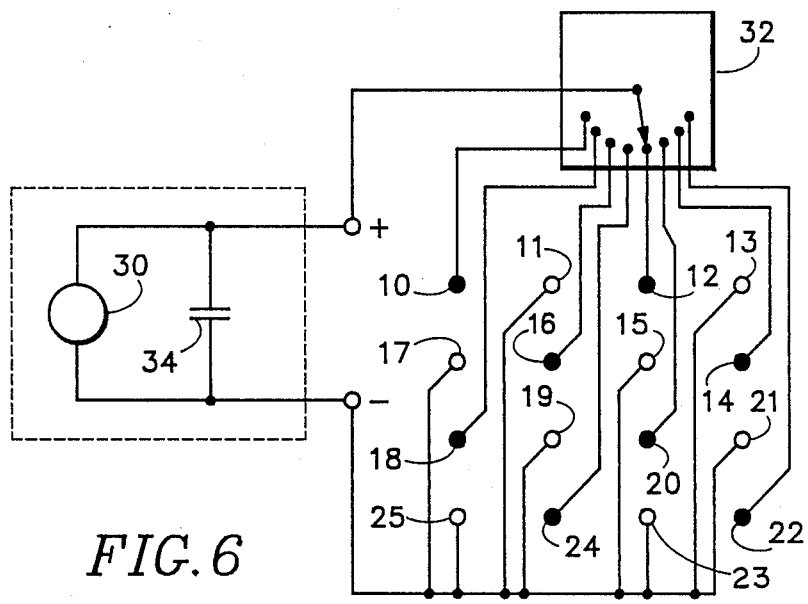
Figure 7:
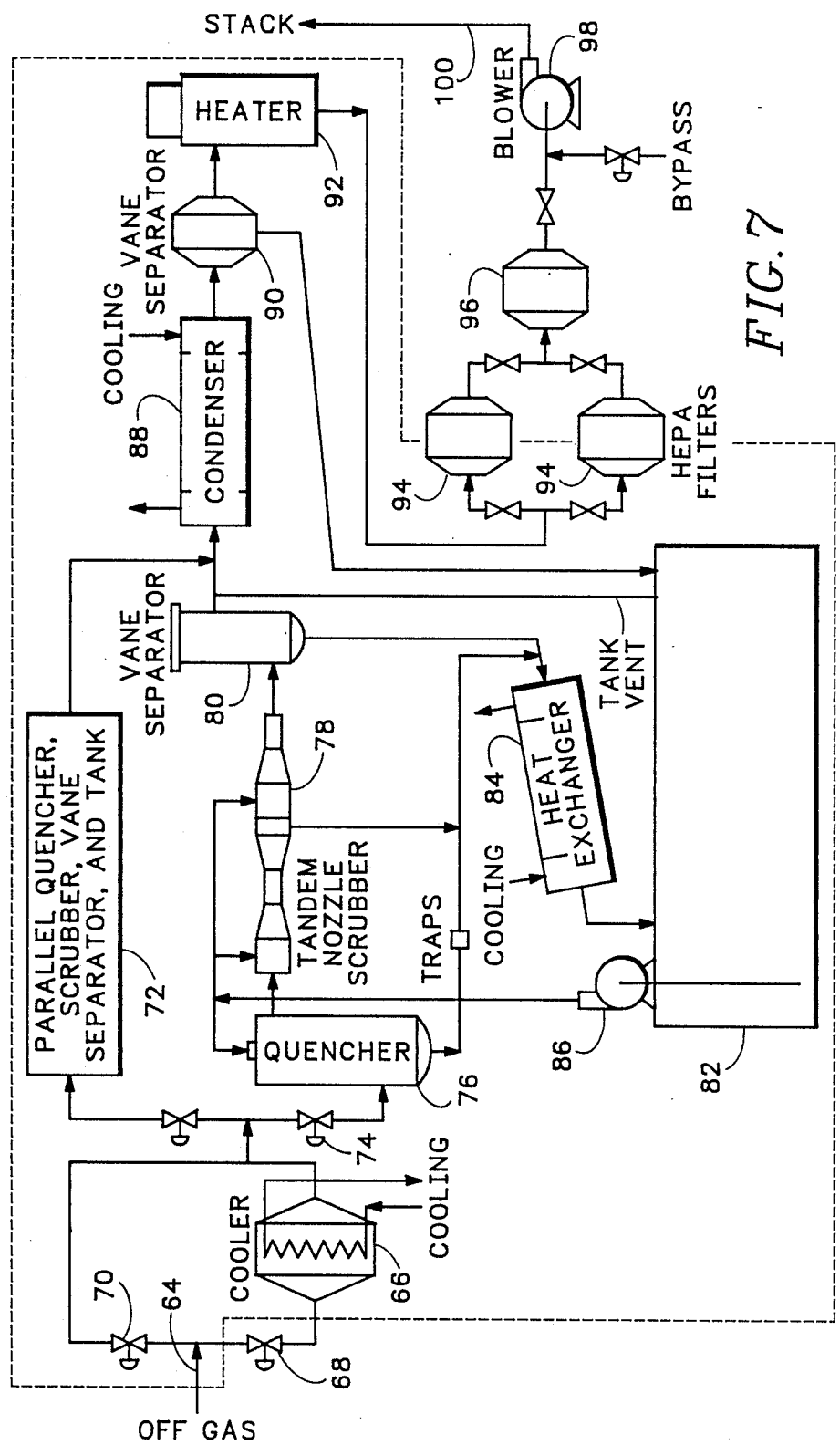

FIG. 3 is a cross-sectional view of an electrode as employed with the FIG. 1 apparatus, FIG. 4 is a side view of in situ heating apparatus, including plural hollow electrodes and a common header, FIG. 5 is a cross-sectional view, partially broken away, of a FIG. 4 electrode, FIG. 6 is an electrical circuit diagram of power supply apparatus employed with the present invention including switching means for plural electrodes, and FIG. 7 is a schematic illustration of gas treatment means as may be employed with the present invention.

DETAILED DESCRIPTION

Figure 2:
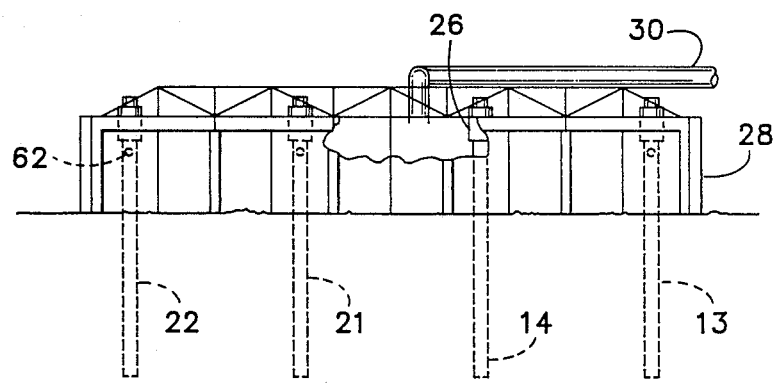
FIG. 2 is a side view of the FIG. 1 apparatus.

Referring to the drawings, and particularly to FIGS. 1 and 2 illustrating soil heating apparatus according to the present invention, a plurality of substantially vertically disposed electrodes 10–5 are slideably supported via insulating feed-throughs 26 from the roof of portable hood 28. Hood 28 is movable with respect to the ground and may be placed over a region containing hazardous material which is to be removed. The hood is also equipped with off-gas outlets 30 connected with the top interior of the hood which suitably lead to a gas treating, recovery, and/or destruction system.

The electrodes 10–25 are either driven into the ground or the ground is pre-drilled for their reception at locations within the underground area containing hazardous materials. The electrodes are suitably formed of one-half to one inch diameter carbon steel or aluminum rod and are inserted into the soil on approximately two foot centers in spaced array as illustrated. The electrodes are connected to a power system that suitably builds an increasing charge amongst the electrodes until discharge occurs. At the point of electrical discharge, heat is generated in the soil for raising its temperature.

The electrodes are connected to a power supply in the manner illustrated in FIG. 6 such that, for example, even numbered electrodes are connected or connectable to the positive side of the source and the odd numbered electrodes are connected or connectable to the negative side. The electrodes are evenly spaced, for example, in a 4×4 array as shown, so that each positive electrode is equally spaced from at least a pair of negative electrodes. Switching means 32 is employed for cyclically energizing positive electrodes 10, 12, 14, 16, 18, 20, 22 and 24 from the positive power supply terminal while the negative electrodes remain connected to the negative power supply terminal. Therefore, at least pairs of electrodes are sequentially actuated for initiating conduction in the ground between such pairs. Alternative switching means are clearly possible, i.e., a switching means similar to means 32 may be interposed between the negative power supply terminals and the respective odd numbered electrodes.

The power supply utilized in FIG. 6 is an impulse generator represented by direct current source 30 and a capacitor bank 34 connected across the terminals of DC source 30. The supply is capable of delivering a high DC voltage in the range of 100–2,000 kilovolts. When the capacitor bank charges to a predetermined level, a discharge takes place in the ground between a pair of electrodes, e.g. between electrode 12 and one or more of electrodes 11, 14, and 15 for the switch position shown. After substantial discharge of capacitor bank 34, the capacitor bank recharges from source 30 until the next discharge takes place between the same electrodes, or other electrodes if the position of switch 32 has been changed. High voltage impulse generators are commercially available and will not be described further.

Generally, the position of switch 32 is maintained for directing sequential discharges between a pair or pairs of electrodes until such electrodes reach a predetermined temperature level after which switch 32 is moved to the next position. Thus, switch 32 is suitably actuated by a timing mechanism (not shown) so that a given positive electrode will support, for example, ten discharges before the next positive electrode in sequence is selected. Typically a period of one second occurs between discharges which allows for gas recombination. The discharge voltage for the circuit of FIG. 6 is primarily dependent upon the spacing of the electrodes, as well as to some degree the type of soil therebetween.

Although applicable to all soil types, the system according to the present invention is most economically employed in regions of dry, sandy soil. As capacitor bank 34 charges, a voltage will be reached for which a discharge will be initiated between selected electrodes. Clearly the circuit can be modified, if desired, to insert additional switching means between capacitor bank 34 and the electrode array such that discharge between electrodes is initiated at a selected voltage level, preferably between 100 kv and 2,000 kv.

For the FIG. 6 circuit as illustrated, if moisture is present in the soil to any great extent, a steady current will first pass through water in the soil, driving off water vapor by resistance heating. As the soil begins to develop non-conductive dry spots, the voltage across the capacitor bank increases further and repetitive arcing through the soil begins. The charge-discharge cycle then continues to impart energy to the soil, heating the soil and driving off the volatiles. Once the soil adjacent the electrodes is dried, the arcing will usually provide higher voltage and higher power input to the soil than the resistive heating.

Referring to FIG. 3, a typical electrode 10 is illustrated in longitudinal cross-section. The electrode is cylindrical, having an inner axial electrode portion 36 suitably formed of carbon steel or aluminum and provided with an enlarged cylindrical tip 38 at its lower extremity. The inner axial portion 36 is covered by an insulating sleeve 40 formed of a high voltage insulating material such as pre-formed mica. Disposed over insulting sleeve 40 is a further metal sleeve 42, suitably carbon steel or aluminum, having the same outside diameter as electrode tip 38 but separated from tip 38 by radial flange 44 of insulating sleeve 40, the last mentioned flange also having the same outside diameter as tip 38. The metal sleeve 42 may be partially or fully withdrawn after the electrode assembly 10 is driven or inserted into the ground to eliminate the possibility of electrical arcing between the electrode tip 38 and metal sleeve 42.

Central portion 36 extends a distance outwardly above sleeves 40 and 42 for receiving electrical connection 46 which may lead to switching means 32 in FIG. 6. Electrical connection 46, as well as the protruding part of electrode portion 36, are suitably covered by high voltage shrink plastic insulation (not shown) rated at 100 kv or greater. An example is shrink-fit Okanite material. The voltage required to arc through dry soil is found to be greater than that required for arcing through air and it is therefore necessary to provide electrical insulation above the soil to prevent unwanted arcing. Alternatively, or in addition, pairs of arcing electrodes may be disposed in angular relation to one another rather than vertically as depicted in FIG. 2. For instance, the lower tips of electrodes 13 and 14 may be angled closer to one another with the upper portions farther apart, possibly eliminating the need for insulating sleeve 40.

Insulating the upper part of the electrode provides a means for concentrating electrical arcing at a given level in the ground to which the electrode is driven. At the same time, sleeve 42 and flange 44 have the same outer diameter as tip 38 to facilitate driving or insertion of the electrode into the ground. Assuming it is desired to initiate electrical discharge at a fairly low ground level, followed by raising the level of discharge so as to sweep through a given ground region, the electrodes of the type illustrated in FIG. 3 may be gradually or intermittently raised after performing desired heating at different levels. The power supply of FIG. 6 may be periodically deactivated and the capacitor bank discharged, after which the electrodes are raised manually from the top of hood 28 by sliding the same upwardly through insulators 26. After adjusting the levels of various electrodes to a higher level, arcing operation can be resumed. Alternatively, each electrode is suitably supplied with means for raising the same. Referring to FIG. 3, a hydraulic cylinder 48 which is mounted to the frame of hood 28 (by means not shown) is provided with an actuating rod 50 pivotally engaging a bracket 52 secured to the outer metal sleeve 42 locked to an electrode. The hydraulic cylinder 48 is periodically or continuously actuated to gradually move the electrode upwardly.

Another type of electrode is illustrated in FIGS. 4 and 5. This type of electrode as illustrated in longitudinal cross-section in FIG. 5 is similar in construction to the FIG. 3 electrode, and primed reference numerals are employed to refer to corresponding elements. However, this electrode is provided with an axial passage 54 extending the whole length thereof for communicating with a 13', 14', 21' and 22' in FIG. 4 are successively negative and positive electrodes and are connected to power supply means by separate conductors (not shown). However, a negative pressure can be applied to header 56 from conduit 60 for drawing hazardous material from the ground as it is volatilized by electric heating. The conduit 60 extends to a plant for generating the negative pressure and treating, recovering, or destroying the gaseous material removed from the ground. Alternatively, selected ones of the hollow electrodes may be connected to a source of stripping air, while other hollow electrodes may serve as means for removing stripping air from the soil being treated.

It will be appreciated the array of hollow electrodes illustrated in side view in FIG. 4 is desirably extended to a 4×4 array as illustrated in FIGS. 1 and 6, with similar connections being made thereto. Such array may or may not be provided with a covering hood 28, inasmuch as gaseous substance may be withdrawn by means of conduit 60 rather than conduits 30. However, the electrodes of FIGS. 1 and 2 may also be made hollow, i.e., to have the cross-section of FIG. 5, being provided with venting means 62 in FIG. 2 underneath hood 28 whereby the gaseous effluent is withdrawn from below the surface of the ground via the electrodes and into hood 28 so as to be withdrawn through conduits 30 in combination with gasses emitted directly upwardly through the ground surface.

Intermittent DC potential applied according to the present invention passes a series of electrical discharges between electrodes inserted in the contaminated soil such that energy dissipated by the discharges heats the soil and volatilizes or destroys organic wastes in the soil. In general, the soil temperature should be raised to at least 150° C. above the boiling point of an organic contaminant to achieve greater than 99% removal efficiency. This means that for removal of light organics, a temperature of about 200° C. should be achieved, and for heavy organics the soil should be heated to about 500° C. or greater. Therefore, a range between 200° C. and 600° C. is preferred in order to attain good efficiency on the one hand without requiring excessive power on the other. However, it is clear some removal can take place below and above this range. The total duration of time required by the discharge regime to heat the soil to the requisite temperature sufficiently for decontamination will depend upon the individual soil content as well as on the material buried therein. Soil temperature is readily measured by conventional means and the process may be continued until the soil region is substantially out-gassed with respect to the contaminant.

Higher soil temperatures which assure destruction of hazardous chemicals are an option. Accordingly, the ground may be heated to a temperature for substantially destroying the contaminant chemicals by pyrolysis, followed by combustion of the pyrolysis products when these products reach the surface. In this case, a higher ground temperature than 600° C. is preferred, although many materials will begin to pyrolyze at 300° C. Thus, a range of 300° C. to 1200° C. is suitable for some degree of destruction of the offending materials in the ground. For achieving combustion when the pyrolysis products reach the surface, the hood 28, as illustrated in FIGS. 1 and 2, may be employed, and an additional inlet (not shown) for combustion gas is suitably provided, with the combustion products being removed via conduits 30. As another alternative, the ground may be heated to the preferred temperature range, i.e., between 200° C. and 600° C., with destruction or other treatment taking place at an above ground location to which the offending substances are conveyed via conduits 30 and FIGS. 1 and 2 or conduit 60 in FIG. 4.

In a test for the removal of 2-chlorophenol test chemical, a removal efficiency of 95 wt. % was achieved in a run time of 4.2 hours, with an average power expenditure of 115 watts. The maximum soil temperature was 304° C. in sandy soil. Successful tests have also been conducted for test deposits of trichloroethene and hexachlorobenzene.

The effluent is suitably conveyed by conduits 30 in FIGS. 1 and 2, or 60 in FIG. 4 to a gas treatment, recovery, or destruction system. By way of example, a treating or cleaning system is depicted in FIG. 7 where the off gas is received at 64 either from the hood of FIGS. 1 and 2 or the header of FIG. 4. In the case of off gas received at very high temperatures, for example in the instance of combustion within hood 28, a cooler 66 is employed and comprises a finned air-to-glycol heat exchanger. This cooler can be by-passed by opening valve 70 and closing valve 68.

From the gas cooler, the off gas is suitably split and directed into one of two wet scrubber systems that operate in parallel. One such system, indicated at 72, is shown in block fashion and the other parallel system will be described. Valve 74 leads to quench tower 76 feeding tandem nozzle scrubber 78 which in turn leads to vane separator 80. The tandem nozzle scrubber may comprise a tandem nozzle hydrosonic scrubber manufactured by Hydro-Sonic Systems, Dallas, Tex. The quencher reduces the gas temperature to about 66° C., and supplies some scrubbing action to remove a portion of entrained particles. The primary functions of the tandem nozzle scrubber are to remove any remaining particles and condense remaining semi-volatile components as well as to provide additional cooling of the off gas. The vane separator that follows is designed to remove all droplets greater than or equal to 12 $\mu$m.

A glycol scrub solution that is injected into the quencher and tandem nozzle scrubber from tank 82 is cooled through heat exchanger 84 before being returned to the process. After the scrub solution is returned to tank 82, it is circulated via pump 86 back to quencher 76 and scrubber 78.

Following the scrubber system, the gas is cooled in condenser 88. The condenser and mist eliminator or vane separator 90 remove droplets greater than or equal to 12 $\mu$m. Final decontamination of off-gas particulates is achieved in a two stage filter/adsorber assembly following heating of the gas at 92. The first stage is composed of two parallel HEPA (high-efficiency particulate air) filters and charcoal adsorbers 94 feeding a single HEPA filter and charcoal adsorber 96.

The gaseous effluents are drawn through the off-gas system components by an induced draft system, the driving force being provided by a blower 98. This blower, which has substantial capacity, is employed to provide negative pressure within hood 28 or within header 56 and the hollow electrodes for aiding in removing gaseous products from the ground. After passing through the blower system, the off-gasses are exhausted to a stack which is indicated at 100.

The system of FIG. 7 is somewhat conventional and it is understood it could be replaced by other gas treatment systems. It may be used alternatively in conjunction with a destruction system comprising controlled air incinerators coupled between the ground site being detoxified and the off-gas system of FIG. 7, particularly in the case where combustion within the hood 28 is not being carried out. Alternatively, ground chemicals may be recovered in a cryogenically cooled condenser or air exchange condenser prior to delivery to the off-gas system of FIG. 7. Various combinations of gas treating systems of this type can be employed.

As an alternative embodiment, a continuous conduction system may be employed with the electrode configuration depicted in FIGS. 1 and 2, wherein an electrically conductive heavy oil is sprayed, inserted or injected into the ground for supporting conduction between the electrodes before power is applied. A higher current, lower voltage source of power is required in such case because of the higher current levels. The voltage utilized is suitably between 1,000 and 4,000 volts, for supporting a current in the ground between electrodes of between 1600 amps and 450 amps. The electrically conductive fluid is suitably sprayed on or inserted into the soil to be treated, so that it is absorbed evenly into the soil, and the electrodes are then inserted into the soil. The electrical conductivity of the fluid will allow sufficient current to pass among the electrodes to dissipate substantial heat in the soil. This method is suitable for heating volumes of soil to relatively low temperatures, e.g. less than 200° C. The first described embodiment, i.e., utilizing high potential arc discharge, is preferred for several reasons. High temperatures can be more easily reached without the introduction of conductive materials and, moreover, the high potential arcing is less dependent upon soil types, i.e., less dependent upon the absorption of the conducting medium in the soil and the appropriate distribution of the conducting medium through the soil.

As a further alternative embodiment, high potential intermittent arcing may be followed by more continuous arcing with a suitable power supply. Source 30 may in such case take the form of an impulse source and a somewhat lower voltage parallel source capable of delivering greater and substantially continuous arcing current.

While several embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. The method of detoxifying waste sites and the like containing hazardous volatilizable material, said method comprising:

inserting at least two electrodes through the soil surface into the ground proximate a said waste site and at spaced points from one another in substantially encompassing array to at least a portion of said waste site, heating a region of ground adjacent the soil surface and therebelow to a temperature below the melting temperature thereof, said temperature being greater than 100° and less than 1200 °C., for an extended period of time in order to volatilize said material by applying a voltage between a pair of said electrodes adjacent the soil surface spanning said region for causing a current flow through said ground region therebetween of a value less than would melt the soil, and collecting said material, as volatilized, above ground level.

2. The method according to claim 1 wherein said temperature is raised to between 200° and 600°C.

3. The method according to claim 1 wherein said applied voltage is in the range of 100 to 2000 kilovolts and heats said ground region by intermittant arcing.

4. The method according to claim 3 further including switching said voltage between various pairs of electrodes.

5. The method according to claim 1 including maintaining a partial vacuum with respect to the region of ground where the temperature is raised for collecting said material as it is volatilized or pyrolyzed.

6. The method according to claim 5 including maintaining a partial vacuum above the ground surface.

7. The method according to claim 6 including collecting said material by at least partially enclosing said site with a collecting hood.

8. The method according to claim 1 including spacing said electrodes on approximately two foot centers.

9. The method of detoxifying waste sites and the like containing hazardous volatilizable material, said method comprising:

inserting plural electrodes into the ground proximate a said waste site and at spaced points from one another, heating a region of ground to a temperature below the melting temperature thereof, said temperature being greater than 100° and less than 1200°C., for an extended period of time in order to volatilize said material by applying a voltage between a pair of said electrodes spanning said region for causing a current flow through said ground region therebetween, further including absorbing electrically conductive heavy oil substantially evenly in the ground region between said pair of electrodes before application of said voltage, and collecting said material as volatilized or pyrolyzed above ground level.

10. The method according to claim 1 wherein said voltage is applied intermittantly to said electrodes to provide intermittant arc discharge in said ground region.

11. The method according to claim 10 including accumulating DC electrical charge to produce said voltage, wherein said arc discharge is provided in response to said charge reaching a predetermined level.

12. A method of detoxifying waste sites and the like containing hazardous volatilizable material, said method comprising:

inserting plural electrodes into the ground proximate a said waste site and at spaced points from one another, heating a region of ground to a temperature below the melting temperature thereof, said temperature being greater than 100° and less than 1200°C., for an extended period of time in order to volatilize said material by applying a voltage between a pair of said electrodes spanning said region for causing a current flow through said ground region therebetween of a value less than would melt the soil, maintaining a partial vacuum with respect to the region of ground where the temperature is raised wherein said partial vacuum is maintained through said electrodes, and collecting said material as volatilized via said electrodes.

\* \* \* \* \*

UNITED STATES PATENT AND TRADEMARK OFFICE
CERTIFICATE OF CORRECTION

PATENT NO : 4,957,393
DATED : September 18, 1990
INVENTOR(S) : James L. Buelt; Kenton H. Oma It is certified that error appears in the above-identified patent and that said Letters Patent is hereby corrected as shown below:

Column 1, line 13, insert a period (.) after "purposes".

Column 2, line 61, delete "10-5" and insert therefor --10-2⁵--.

Column 5, lines 12 and 13, after "communicating with a" insert --header 56 by way of insulating tube 58. Electrodes--.

Column 6, line 12, "As another alternative," should begin a new paragraph.

Signed and Sealed this

Twenty-second Day of February, 1994

BRUCE LEHMAN

*Attest:*

*Attesting Officer*     *Commissioner of Patents and Trademarks*